(12) United States Patent
Droesbeke et al.

(10) Patent No.: US 9,459,420 B2
(45) Date of Patent: Oct. 4, 2016

(54) BOARD CONNECTOR

(71) Applicant: FCI Asia PTE. LTD, Singapore (SG)

(72) Inventors: Gert Julien Droesbeke, Besancon (FR); Sven Klinkicht, Berlin (DE); Alex Eichler-Neumann, Berlin (DE); Ulrich Dieter Felix Keil, Berlin (DE)

(73) Assignee: FCI Asia Pte. Ltd., KA Place (SG)

( * ) Notice: Subject to any disclaimer, the term of this patent is extended or adjusted under 35 U.S.C. 154(b) by 0 days.

(21) Appl. No.: 14/438,667

(22) PCT Filed: Oct. 29, 2012

(86) PCT No.: PCT/IB2012/002651
§ 371 (c)(1),
(2) Date: Apr. 27, 2015

(87) PCT Pub. No.: WO2014/068350
PCT Pub. Date: May 8, 2014

(65) Prior Publication Data
US 2015/0293318 A1    Oct. 15, 2015

(51) Int. Cl.
*G02B 6/42* (2006.01)
*G02B 6/38* (2006.01)

(52) U.S. Cl.
CPC ........... *G02B 6/4292* (2013.01); *G02B 6/3897* (2013.01); *G02B 6/425* (2013.01); *G02B 6/4206* (2013.01); *G02B 6/428* (2013.01); *G02B 6/4214* (2013.01); *G02B 6/4249* (2013.01); *G02B 6/3893* (2013.01)

(58) Field of Classification Search
CPC G02B 6/3893; G02B 6/3897; G02B 6/4206; G02B 6/4214; G02B 6/4249; G02B 6/425; G02B 6/428; G02B 6/4292
See application file for complete search history.

(56) References Cited

U.S. PATENT DOCUMENTS

| | | | | |
|---|---|---|---|---|
| 2004/0234210 A1* | 11/2004 | Nagasaka | ............ | G02B 6/4214 385/88 |
| 2008/0232737 A1* | 9/2008 | Ishigami | .............. | G02B 6/4201 385/14 |
| 2010/0215312 A1* | 8/2010 | Daikuhara | ........... | G02B 6/4204 385/14 |

FOREIGN PATENT DOCUMENTS

| | | | |
|---|---|---|---|
| JP | 2000292658 A | | 10/2000 |
| JP | 2000292658 A | * | 10/2000 |

* cited by examiner

*Primary Examiner* — Peter Radkowski
(74) *Attorney, Agent, or Firm* — Wolf, Greenfield & Sacks, P.C.

(57) ABSTRACT

A connector mounted on a board. The connector includes one or more elements mounted on the board by means of a cured adhesive, which is at least partly present between the element and at least one anchoring element, E.g., the board mounted element may include one or more holes filled, with the cured adhesive embedding one or more of the at least one anchoring elements. The board mounted element may for instance be an optical coupler.

10 Claims, 8 Drawing Sheets

BOARD CONNECTOR

FIELD OF THE DISCLOSURE

The invention relates to a board connector for connecting a complementary second connector such as an optical cable connector, to a substrate, such as a printed circuit board. The connector comprises one or more elements mounted on the printed circuit board, such as an optical coupling device for receiving light signals to be guided to a transducer on the substrate.

BACKGROUND OF THE DISCLOSURE

When the complementary second connector is brought into engagement with the board connector the internals of the board connector can be dislocated. Small changes of the position of internal elements involved in signal transfer, can result in substantial loss of signal integrity. These internals can for instances be mounted to the board by means of an adhesive. This results in shear stresses in the adhesive.

This problem particularly occurs with optical cable connectors, which must be pressed against a light receiving element in order to achieve accurate positioning and reliable fixation.

It is an object of the present invention to provide a more reliable way of fixating the positions of board connector elements in a reliable and stable manner.

SUMMARY OF THE DISCLOSURE

A connector is disclosed which is mounted on a board for connecting the board to a complementary connector. The connector comprises one or more board mounted elements mounted to the board by means of a cured adhesive. The adhesive is at least partly present between the element and at least one anchoring element. As a result, the adhesive will not only be subjected to shear loads, but particularly to compression loads when the board mounted element is submitted to a pressure or bending load.

A number of anchoring elements can be used along the outline of the board element. Alternatively, or additionally, the board mounted element can for example be provided with one or more holes filled with the cured adhesive embedding one or more anchoring elements mounted on the board.

The anchoring element can for example be a separate anchoring element or it can be a functional element, e.g. an electrical component, such as a capacitor, already present on the board. This combines the anchoring function with the electrical function and reduces the number of board mounted parts. Alternatively, the anchoring element can be a retention clip, a grounding element or a part of a shielding cage.

Suitable adhesives include UV curable or thermally curable adhesives, such as epoxy based adhesives.

The board mounted elements can for example be an optical coupling device for receiving light from an array of optical fibers presented by a complementary optical cable connector to a transducer element, where light signals are translated into electronic signals.

Such an optical coupling device can for example comprise a receiving surface facing the array of optical fibers when the complementary optical cable connector is connected, the receiving surface being provided with an array of lenses, wherein each lens is configured to face one of said optical fibers.

Optionally, the optical coupling device comprises a body of a light guiding material with a back face under an angle to deflect light entering the optical coupling device via the lenses downwardly towards the transducer element. The optical coupling device may for instance comprise a light transfer face facing the transducer element, the light transfer face comprising as array of lenses, each lens focusing light from an associated lens at the receiving faces.

BRIEF DESCRIPTION OF THE DRAWINGS

The invention will be further explained under reference to the accompanying drawings.

DETAILED DESCRIPTION OF EMBODIMENTS

Figures 1A, 1B:
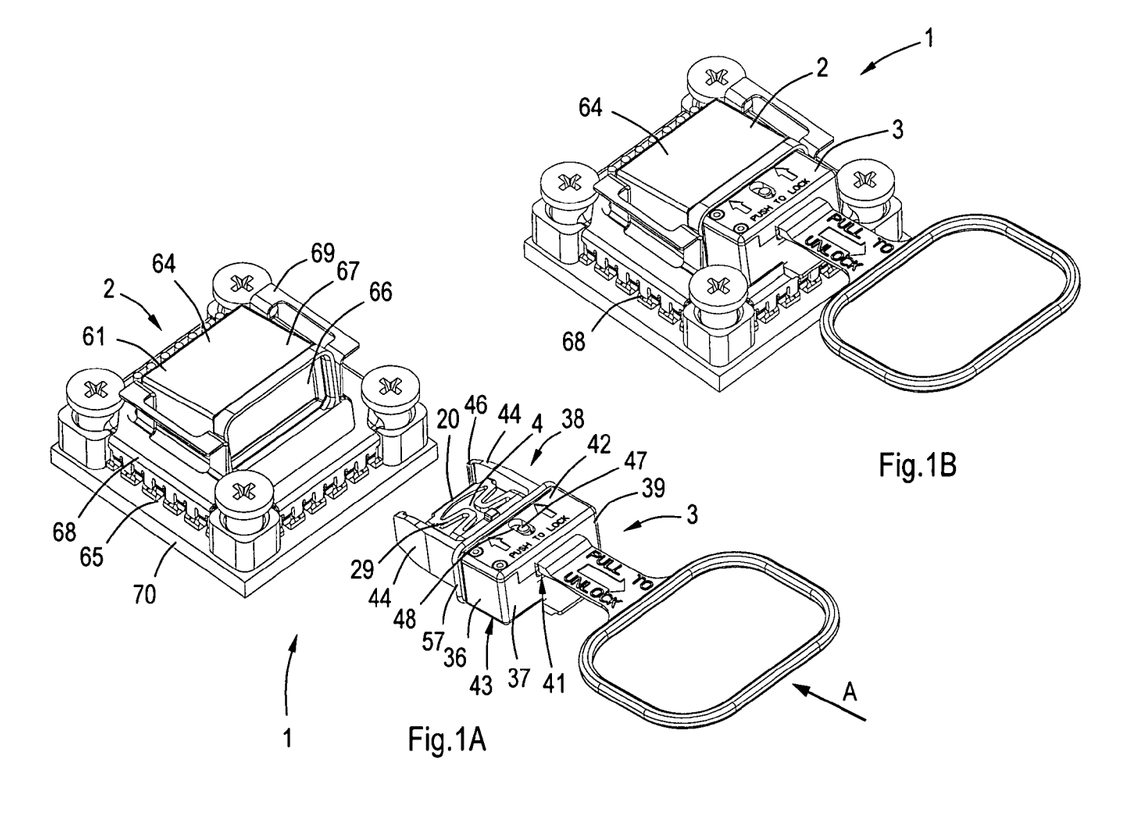
FIG. 1A: shows an exemplary embodiment of a connector with a complementary second connector.
FIG. 1B: shows the two connectors of FIG. 1A in an assembled state.
Figures 3A, 3C:
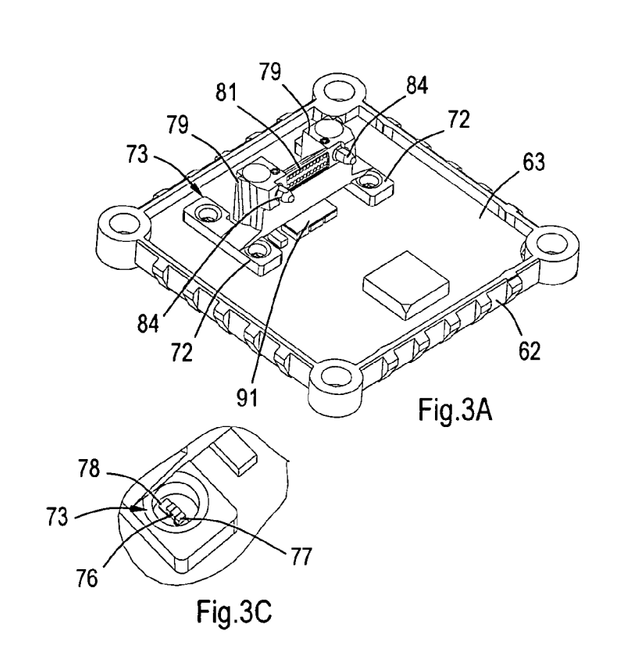
FIG. 3A: shows in perspective view the internal configuration with an optical coupling device member of the connector of FIG. 1.
FIG. 3C: shows in detail a mounting section of the optical coupling device member of FIG. 3A.
Figure 4A:
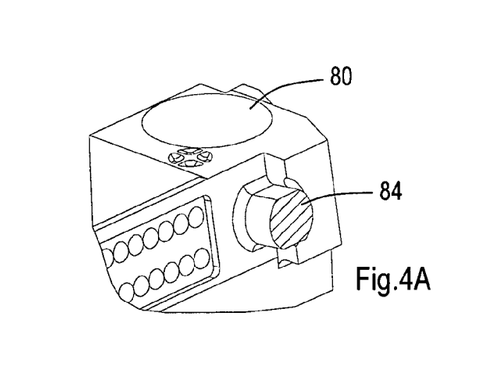
FIG. 4A: shows a detail of the optical coupling device member of FIG. 3A.
Figure 4B:
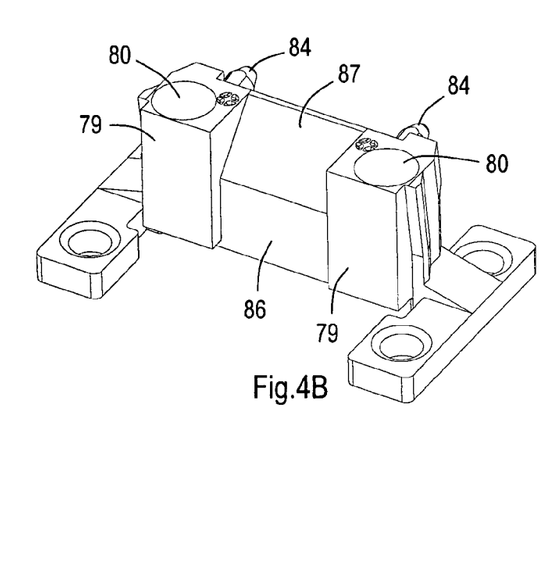
FIG. 4B: shows in perspective roar view the optical coupling device member of FIG. 3A.
Figure 4C:
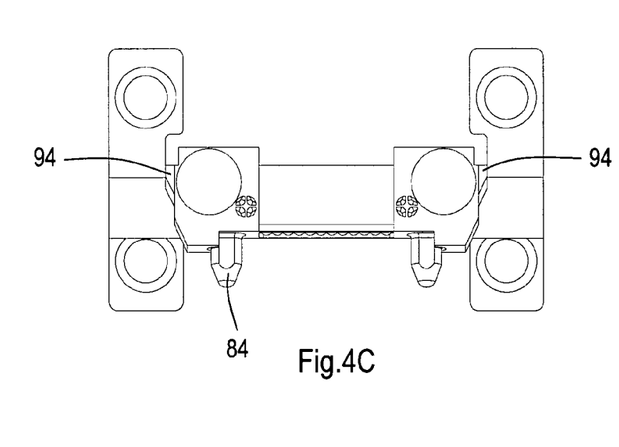
FIG. 4C: shows the optical coupling device member of FIG. 3A in top view.
Figure 4D:
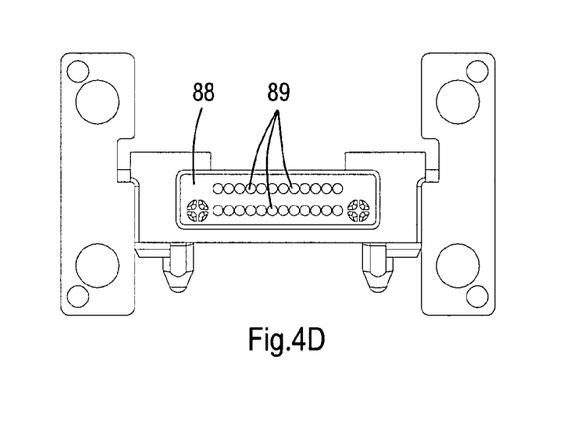
FIG. 4D: shows the optical coupling device member of FIG. 3A in bottom view.
Figure 5A:
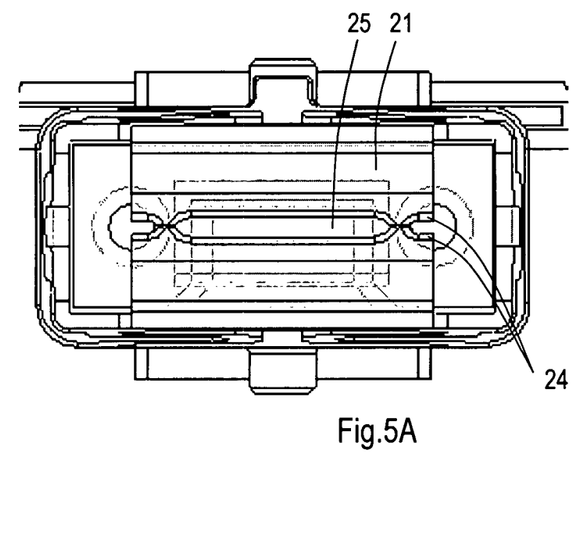
FIG. 5A: shows the second connector in front view.
Figure 5B:
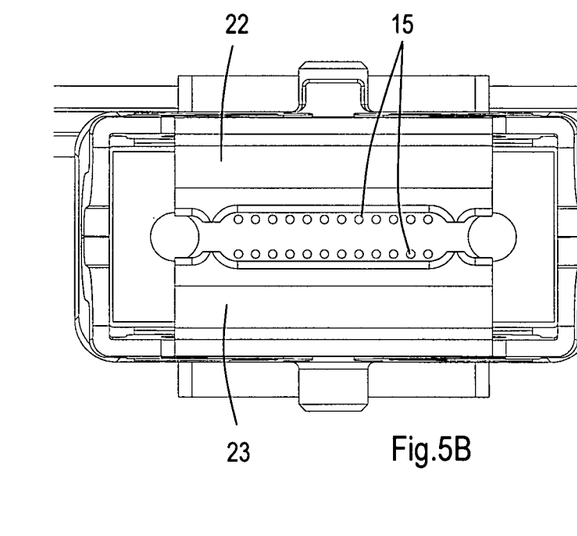
FIG. 5B: shows the second connector in front view during connection with the first connector.
Figure 6A:
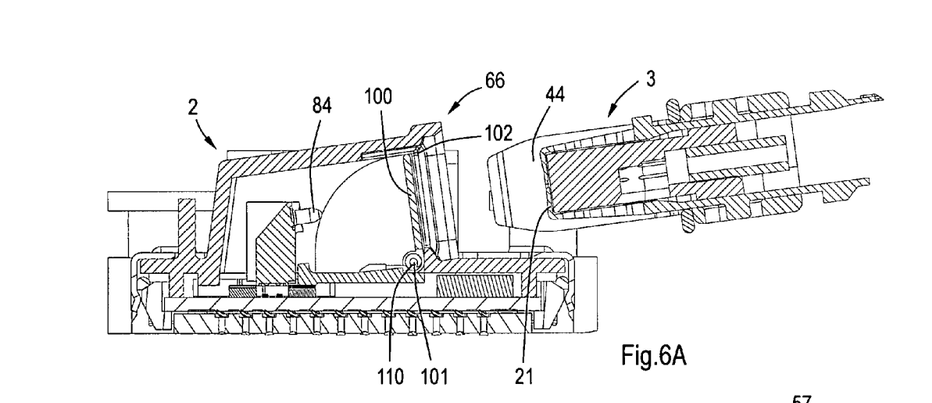
FIG. 6A: shows in cross section the connector and the complementary connector of FIG. 1 just before being mated.
Figure 6B:
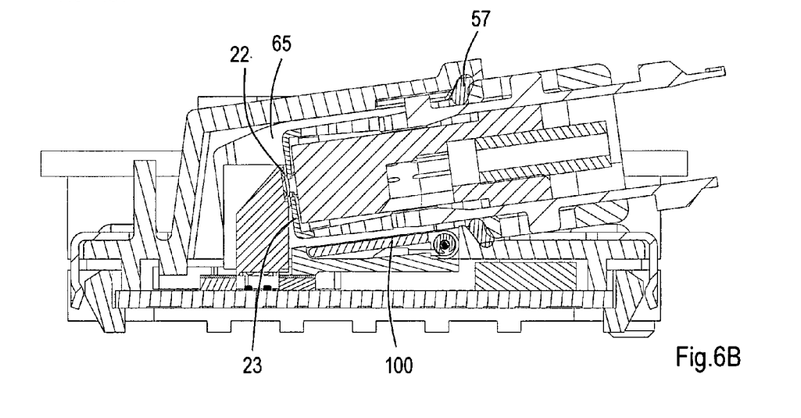
FIG. 6B: shows the connector and the complementary connector of FIG. 1 just after being mated in cross section along a vertical plane.
Figure 7A:
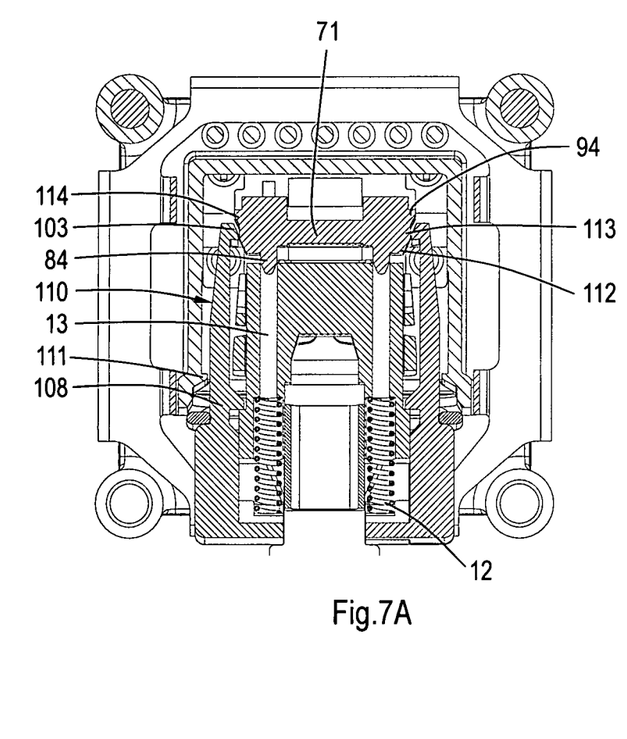
FIG. 7A: shows the two connectors in a cross section along a horizontal plane during mating.
Figure 7B:
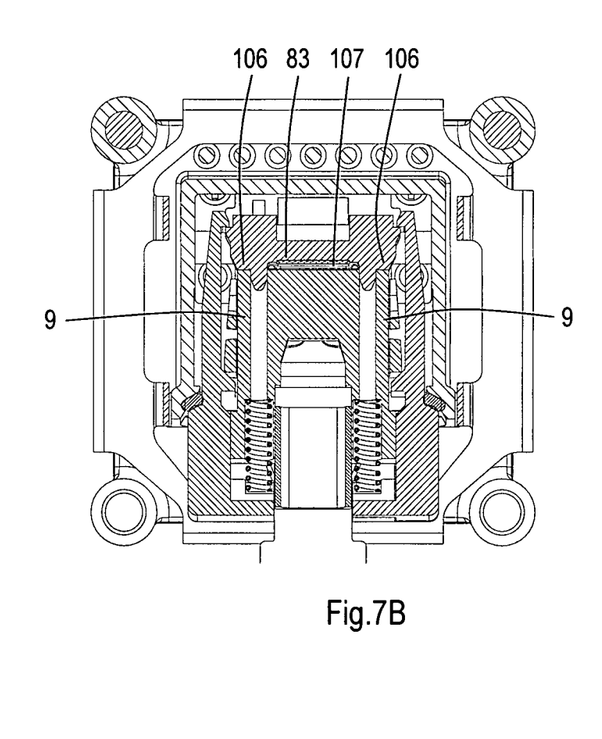
FIG. 7B: shows the two connectors in a cross section along a horizontal plane after being mated.
Figure 8A:
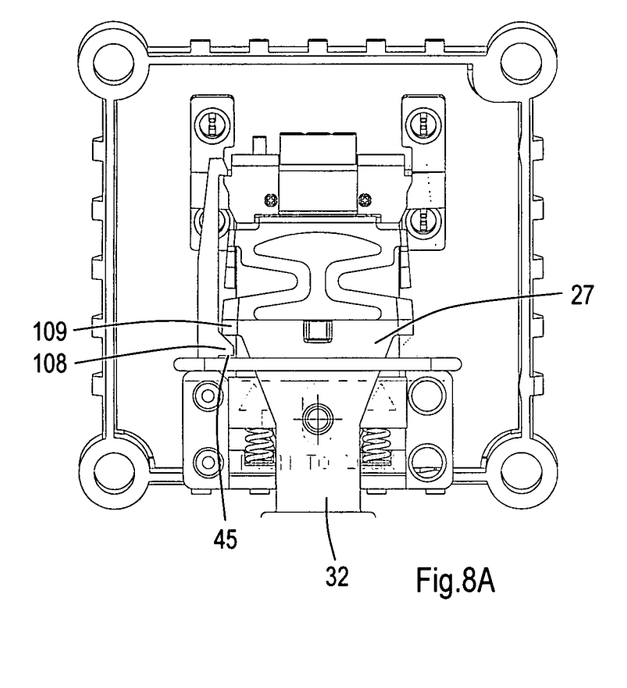
FIG. 8A: shows the two connectors in a cross section along a horizontal plane during disconnection.
Figure 8B:
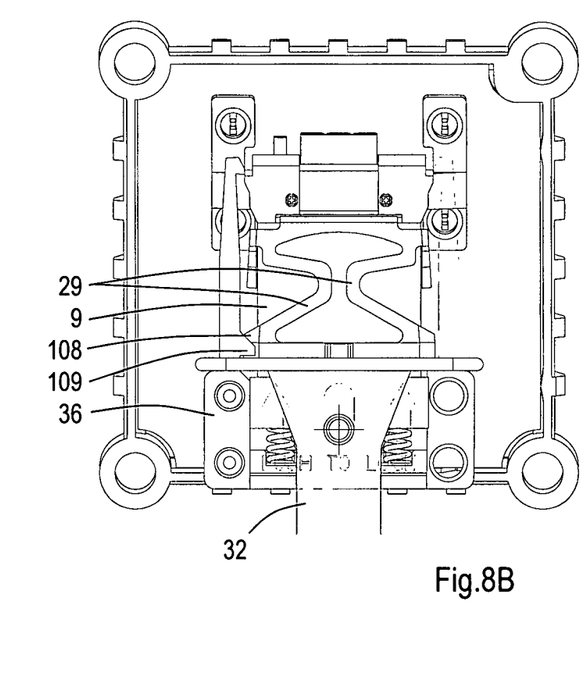
FIG. 8B: shows the two connectors in a cross section along a horizontal plane after being disconnected.

FIGS. 1A and 1B show an exemplary embodiment of a connector assembly 1 or a board connector 2 and a complimentary optical cable connector 3. In FIG. 1A, the optical cable connector FIG. 3C: shows in detail a mounting section of the optical coupling device member of FIG. 3A;

FIG. 4A: shows a detail of the optical coupling device member of FIG. 3A;

FIG. 4B: shows in perspective roar view the optical coupling device member of FIG. 3A;

FIG. 4C: shows the optical coupling device member of FIG. 3A in top view;

FIG. 4D: shows the optical coupling device member of FIG. 3A in bottom view;

FIG. 5A: shows the second connector in front view;

FIG. 5B: shows the second connector in front view during connection with the first connector;

FIG. 6A: shows in cross section the connector and the complementary connector of FIG. 1 just before being mated;

FIG. 6B: shows the connector and the complementary connector of FIG. 1 just after being mated in cross section along a vertical plane;

FIG. 7A: shows the two connectors in a cross section along a horizontal plane during mating;

FIG. 7B: shows the two connectors in a cross section along a horizontal plane after being mated;

FIG. 8A: shows the two connectors in a cross section along a horizontal plane during disconnection;

FIG. 8B: shows the two connectors in a cross section along a horizontal plane after being disconnected.

DETAILED DESCRIPTION OF EMBODIMENTS

FIGS. 1A and 1B show an exemplary embodiment of a connector assembly 1 or a board connector 2 and a complimentary optical cable connector 3. In FIG. 1A, the optical cable connector 3 is moved in a mat hip direction A to be connected to the board connector 2, as shown in FIG. 1B.

Figures 2A, 2B:
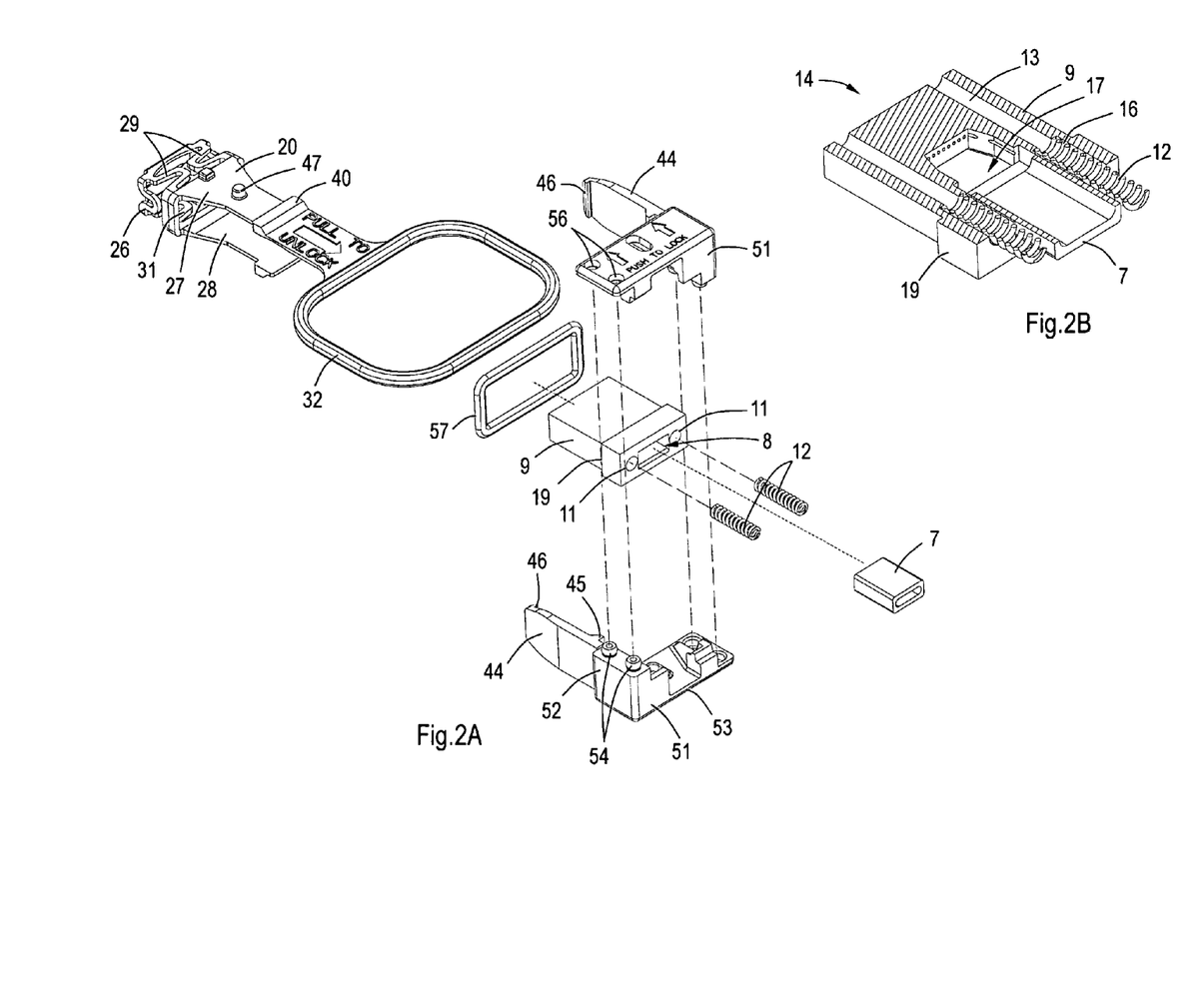
FIG. 2A: shows the second connector of FIG. 1 in exploded view.
FIG. 2B: shows in perspective cross section a cable connection of the connector of FIG. 2A.

The optical connector 3 comprises a plug 4 at the end of an optical cable (not shown). The plug 4 is shown in exploded view in FIG. 2A and comprises a rectangular cable bent relief 7 of a rubber-like material holding the end of the optical cable to protect the fibers from overstressing by bending. The cable holder 7 is partly inserted into a matching rectangular opening 8 in a ferrule 9. The rectangular opening 8 is flanked by two cylindrical openings 11, each holding one end of a compression spring 12. Openings 13 of a smaller diameter extend coaxially from the cylindrical openings 11 to the opposite end 14 of the ferrule 9. This end exposes the terminal ends of the optical fibers 15 (see FIG. 5B). A shoulder 16 is formed between the larger openings 11 and the smaller openings 13. The compression springs 12 abut the shoulder 16.

The ferrule 9 has a central opening 17 filled with a cured adhesive fixating the fiber ends within the ferrule 9.

The ferrule 9 is capped by release member 20. The release member 20 is a single piece, e.g., of a resilient elastomeric material, and comprises a shutter 21 hiding the end 14 of the ferrule 9. As shown in FIGS. 5a and 5B, the shutter 21 is formed by an upper blade 22 and a lower blade 23 which can be separated to expose the optical fibers 15 when the cable connector 3 is connected to the board connector 2. The upper and lower blades 22, 23 face each other with edges provided with spacers 24 creating a split 25.

The release member 20 further comprises a U-shaped resilient bridge 26 at lateral both sides of the ferrule 9. The U-shaped bridges 26 bias the blades 22, 23 towards each other. In this position the shutter 21 closes off the terminal ends of the optical fibers 15, protecting the fiber ends against moisture, dirt and mechanical impact.

An upper web 27 of the release member 20 covers the top side of the ferrule 9. Similarly, a lower web 28 is provided below the lower side of the ferrule 9. One end of the upper web 27 is resiliently connected to the upper ends of the two U-shaped bridges 26 and the upper blade 22 by means of two mirrored C-shaped resilient members 29 symmetrically arranged back-to-back in a mirrored manner. Similarly, one end of the lower web 28 is resiliently connected to the lower ends of the two U-shaped bridges 26 and the lower blade 23 by means of two similarly mirrored C-shaped resilient members 31.

At the cable side of the plug the upper web 27 of the release member 20 is connected to a pull tab 32, which can be pulled by a user to disconnect the cable connector 3, as will be explained hereinafter.

The cable connector 3 further comprises a locking device 36 (see FIG. 1A) with a box-shaped main body 37 having an open side 33 receiving the ferrule 9 and a closed side 39 with a cable passage 41. An upper face 42 of the main body 37 covers the upper web 27 of the release member 20, while a lower face 43 of the main body 37 covers the lower web 28 of the release member 20.

The locking device 36 has two symmetrically arranged mirrored latches 44 extending from the main body 37 pointing into the mating direction A. The latches 44 cover the side faces of the ferrule 9 and the U-shaped bridges 26 of the release member 20.

The front end 19 of the ferrule 9 is somewhat broader. The open side 32 of the main body 37 is bordered with a collar 45 for enclosing the broadened front end 19 of the ferrule 9 to limit the sliding movement of the ferrule relative to the release member (see FIG. 8A).

The latches 44 have a free end provided with a cam 46. The two cams 46 point to each other and project in mating direction A over a distance from the shutter 21. The upper and lower webs 27, 28 of the release member 20 are provided with ridges 40 creating a labyrinth between the shutter and the locking device 36 to protect the internals, in particular the optical coupling device 71 from dust. Internally, the compression springs 12 are compressed between the shoulder 16 and the inner surface of the main body 37 of the locking device 36.

The upper and lower webs 27, 28 of the release member 20 are both provided with a central projection 47 moveable in the mating direction A in a slit 48 at the topside and bottom side of the main body 37, respectively (see FIGS. 8A and 8B).

The locking device 36 is formed by two identical angled parts 51, both having a short side 52 forming the lateral sides of the locking device 36, and a long side 53, forming the top and bottom sides of the locking device 36. The short and long sides 52, 53 of the parts 51 are under right angles. The latches 44 extend from the short sides. The short side 52 has one side edge connected to an end of longer side 53, while the opposite side edge comprises two parallel studs 54, which can be snapped into matching openings 56 in the longer side 53 of the other angled part 51 to form the assembled locking device 36. The two parts 51 are held together by an elastic band 57.

The exemplary embodiment of the board connector 2 as shown in the drawings is a transceiver with a top cover 61 with four corners bolted onto a rectangular lower housing section 62 holding an internal transceiver board 63 carrying the opto-electronic elements 91 and the feet 72 of the optical coupling device 71 (see FIG. 3A). The board connector 2 is mounted into a socket 65 mounted on a substrate 70, such as a printed circuit board (see FIG. 1A). The top cover 61 comprises a casing 64 with one side having a receiving opening 66 for receiving the cable connector 3. The top side 67 of the casing 6 slants downwardly from the side with the receiving open 66 to the opposite side of the casing 64. A locking ring 68 with two opposite pinching grips 69 is put over the casing 64 to lock the board connector 2 in the socket 65.

Figure 3B:
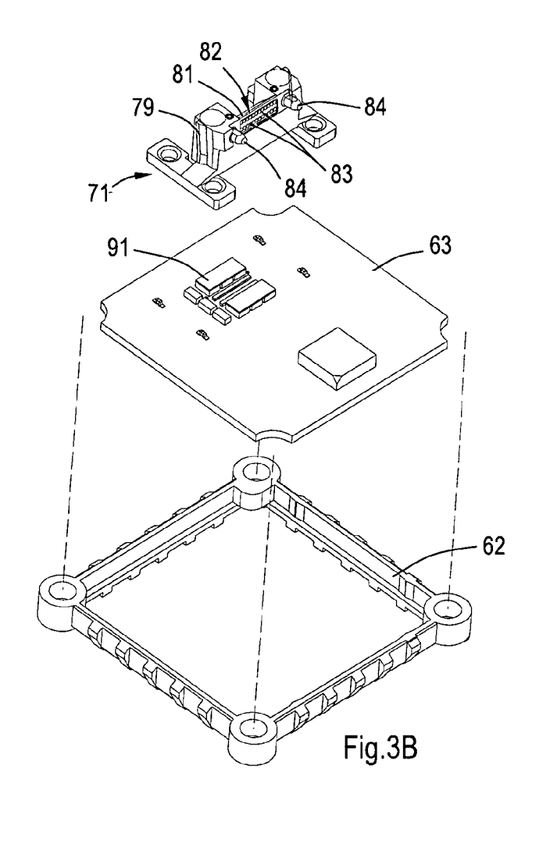
FIG. 3B: shows the configuration of FIG. 3A in exploded view.

The internals of the board connector 2 are shown in FIGS. 3a and 3B. An optical coupling device or optical coupling device 71 is positioned on the substrate 63 to face the optical fibers 15 of the optical connector 3 when it is received in the board connector 2. The optical coupling device 71 comprises two feet 72. Both feet 72 have two openings 73 filled a cured adhesive 74 embedding an anchoring element 76 mounted on an internal connector substrate 63 (see FIG. 3C). Forces exerted to the optical coupling device 71 when the connectors 2, 3 are connected or disconnected, are absorbed as compression stresses and bending stresses by the anchoring elements besides internal shear stresses in the adhesive and peel stresses between the adhesive and the substrate. This way, the anchoring elements 76 contribute to a more reliable fixation of the optical coupling device member 71. In the embodiment shown in FIG. 3C, the anchoring element 76 is a capacitor 77 mounted on the board by two capacitor feet 78.

Between the feet 72 the optical coupling device member 71 carries two rectangular columns 79 sandwiching a prism 81. The prism 81 has a flat front face 82 with an array of lenses 83 facing the respective optical fiber ends 16 of the cable connector 3 when the connectors 2, 3 are connected. The array of lenses 83 is flanked by two symmetrically arranged parallel pegs 84 extending from the columns 79. The pegs 84 serve to open the shutter 21 of the optical cable connector 3 when the optical cable connector 3 is connected to the board connector 2.

The back side of the prism 81 (see FIG. 4B) Has a vertical lower part 86 and a light reflective upper part 87 which slants under an angle to deflect light entering the prism 81 via the lenses 83 downwardly to the bottom 88, where the light leaves the optical coupling device 71 via a second array of lenses 89 (see FIG. 4D). Each lens 83 of the first array transfers light signals to a single lens 89 of the second array. The is then received by an opto-electronic element 91, such as VCEL or a PIN photo diode, located on the substrate 63 below the bottom side of the prism 81 (see FIG. 3A). The opto-electronic element 91 translates the light signals into electronic signals to be transferred via circuitry (not shown) printed on the substrate 63.

The tops 80 of the columns are configured as flat, substantially horizontal surfaces and are suitable for use with automated vacuum nozzles pick and place systems.

At the side of the feet 72 both columns 79 have a vertical ridge 94 (see FIGS. 4C and 71 for cooperation with the latches 44 of the locking device 36 when the optical connector 3 is connected to the board connector 2, as will be explained hereinafter.

FIG. 6A shows in cross section the cable connector 3 approaching the board connector 2 just before being connected. The receiving opening 66 of the top cover 61 is closed by a flap 100 connected to the lower edge of the receiving opening 66 by means of a hinge 101, allowing movement of the flap 100 between a first position closing off the receiving opening 66, as shown in FIG. 6A, and a second position, when the flap 100 is folded backwards towards the optical coupling device 71. A torsion spring 110 biases the flap 100 to the cinema position, where it abuts a stop 102 at the edge of the receiving opening 66.

The VCEL's or photo PIN diodes 91 comprise drivers 105 generating heat. The interior of the to cover 61 is profiled to tightly contact the top surfaces of the drivers 105 in such a way that no air gap remains between the top cover 61 and these respective surfaces. This enables effective dissipation via the top cover 61. The top cover 61 comprises an inwardly protruding vertical brim 111 fitting against the back face of the optical coupling device and covering the drivers 105. Air gaps and inclusions can be avoided by applying an air gap filler material between the drivers and the inner surface of the top cover.

When the cable connector 3 is inserted into the receiving opening 66 of the board connector 2, the flap 100 is folded down and the plug 4 is pushed towards the optical coupling device 71 until the shutter 21 hits the pegs 84. The pegs 84 are cylindrical with flattened upper and lower sides (see FIG. 4A) dimensioned to wedge the split 25 between the upper and lower blades 22, 3 of the shutter. As a result the upper and lower blades 22, 23 are forced apart against the action of the resilient U-shaped bridges 26 of the release member 20. In this position, the fiber ends 15 are exposed (see FIG. 5B). Pushing the plug 4 further into the board connector 3 will insert the pegs 84 into the smaller diameter opening 13 in the ferrule 9 (see also FIG. 7A). The pegs 84 are dimensioned to snugly fit within the openings 13 to enable very accurate positioning of the fiber ends 15 relative to the lenses 83 of the optical coupling device 71 (see FIG. 7A).

The mating process is shown from above in FIGS. 7a and 7B. During positioning respective contact faces 103 of the cams 46 of the latches 44 encounter parallel contact faces 114 the vertical lateral ridges 94 of the optical coupling device 71. Meanwhile, the outer end of the ferrule 9 encounters spacers 106 of the optical coupling device 71 right next to the pegs 84. The spacers 106 are dimensioned to space the fiber ends 15 very accurately at a desired distance from the lenses 83 of the optical coupling device 71, forming a gap 107 of uniform width. Although the ferrule 9 is stopped by the spacers 106, the locking device 36 can be pushed further inwardly against the action of the compression springs 12 until the cams 46 of the latches 44 hook behind the ridges 94, preventing unintentional disconnection of the connectors 2, 3. In this position, the compression springs 12 exert a continuous pressure pressing the plug 4 against the optical coupling device 71, fixating the fibers ends 15 relative to the lenses 83, which contributes to the overall reliability of the connector system.

The connectors 2, 3 can be disconnected by pull tab 32. In the locked position the contact end of the connector 2 is fit between the inner surfaces of the board connector 3 in such way that the shutter blades cannot be moved apart by pulling the bull tab 32. The mirrored pair of C-shaped resilient members 29, 31 is stretched, while the locking device 36 and the ferrule 9 stay in place. The latches 44 have a slanting base 108 forming a contact face of a pushing section 109 of the release member 20. The pushing section 109 is positioned at a point were the C-shaped resilient member 29, 31 is linked to the upper web 27, or to the lower web 28 respectively. The pushing section 109 projects over a lateral distance from the upper and lower webs 27, 28. The pushing section 109 presses against the contact face 108 of the latches 44. As a result, the latches 44 are pushed aside and eventually unhooked from the ridges 94. The compression springs 12 and the C-shaped resilient members 29, 31 are now allowed to relax. The locking device 36 is pushed backwardly by the springs 12. This contributes to easier removal of the cable connector 3.

The invention claimed is:
1. A connector mounted on a board, the connector comprising one or more elements mounted on the board by means of a cured adhesive, wherein the adhesive is at least partly present between the element and at least one anchoring element, wherein a first one of the at least one anchoring element comprises an electrical component.

2. A connector according to claim 1 wherein the board, mounted element comprises one or more holes filled with the cured adhesive embedding one or more of the at least one anchoring elements.

3. A connector according to claim 1 wherein a second one of the at least one anchoring element is an element selected from the group of electrical components, retention clips, shielding cages and grounding elements.

4. A connector according to claim 1 wherein the adhesive comprises a thermally and/or UV cured adhesive.

5. A connector according to claim 1 wherein the adhesive is an epoxy adhesive.

6. A connector according to claim 1 wherein at least one of the one or more board mounted elements is an optical coupling device for receiving light from an array of optical fibers presented by a complementary optical cable connector.

7. A connector according to claim 6 wherein the optical coupling device comprises a receiving surface facing the array of optical fibers when the complementary optical cable connector is connected, the receiving surface being provided with an array of lenses, wherein each lens is configured to face one of said optical fibers.

8. A connector according to claim 7 wherein the optical coupling device comprises a prism of a light guiding material with a back face under an angle to deflect light entering the optical coupling device via the lenses downwardly towards a transducer element.

9. A connector according to claim 8 wherein the optical coupling device comprises a light transfer face facing the transducer element, the light transfer face comprising an array of lenses, each lens focusing light from an associated lens at the receiving face.

10. A connector according to claim 1 wherein the first one of the at least one anchoring element comprises a capacitor.

* * * * *